United States Patent
Watters (10) Patent No.: US 10,387,465 B2
(45) Date of Patent: Aug. 20, 2019

(54) DISPLAY OF RELEVANT INFORMATION FROM MULTIPLE DATA SOURCES

(71) Applicant: SAP SE, Walldorf (DE)

(72) Inventor: Dan Watters, Cupertino, CA (US)

(73) Assignee: SAP SE, Walldorf (DE)

( * ) Notice: Subject to any disclaimer, the term of this patent is extended or adjusted under 35 U.S.C. 154(b) by 234 days.

(21) Appl. No.: 14/976,628

(22) Filed: Dec. 21, 2015

(65) Prior Publication Data

US 2017/0177707 A1    Jun. 22, 2017

(51) Int. Cl.
| | | |
|---|---|---|
| G06F 17/30 | (2006.01) | |
| G06F 16/33 | (2019.01) | |
| G06F 16/335 | (2019.01) | |
| G06F 16/338 | (2019.01) | |
| G06F 16/26 | (2019.01) | |

(52) U.S. Cl.
CPC ............ *G06F 16/334* (2019.01); *G06F 16/26* (2019.01); *G06F 16/335* (2019.01); *G06F 16/338* (2019.01)

(58) Field of Classification Search
CPC ....................................................... G06F 17/30
See application file for complete search history.

(56) References Cited

U.S. PATENT DOCUMENTS

| | | | | |
|---|---|---|---|---|
| 7,093,200 B2 * | 8/2006 | Schreiber | .......... | G06F 17/30557 707/E17.032 |
| 7,912,823 B2 * | 3/2011 | Ferrari | .................. | G06F 3/0482 707/705 |
| 2005/0144554 A1 * | 6/2005 | Salmon | ............. | G06F 17/30643 715/277 |
| 2007/0022107 A1 * | 1/2007 | Yuan | .................. | G06F 17/30684 707/999.004 |
| 2009/0327257 A1 * | 12/2009 | Abouzeid | ......... | G06F 17/30398 707/999.004 |
| 2010/0161646 A1 * | 6/2010 | Ceballos | ........... | G06F 17/30398 707/769 |
| 2014/0282261 A1 * | 9/2014 | Ranz | ..................... | G06F 3/0482 715/838 |
| 2015/0286342 A1 | 10/2015 | MacArthur et al. | | |

FOREIGN PATENT DOCUMENTS

WO    WO 2005/050476 A1    6/2005

OTHER PUBLICATIONS

Extended European Search Report dated Mar. 16, 2017, for European Application No. 16002506.0; 9 pages.
Communication pursuant to Article 94(3) EPC, for European Patent Application No. 16002506.0, 8 pages, dated Feb. 13, 2019.

* cited by examiner

*Primary Examiner* — Khanh B Pham
(74) *Attorney, Agent, or Firm* — Sterne, Kessler, Goldstein & Fox P.L.L.C.

(57) ABSTRACT

The present disclosure provides methods, devices, systems, and computer program products for displaying relevant information related to user roles from multiple data sources and in multiple application environments. Also provided are methods, devices, systems, and computer programs for collecting and compiling information, data, and content from one or more sources according to a user's domains, roles, and/or sub-roles.

18 Claims, 4 Drawing Sheets

DISPLAY OF RELEVANT INFORMATION FROM MULTIPLE DATA SOURCES

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

BACKGROUND

In today's business environment, there is an ever-increasing amount of data generated as businesses track and store more and more information. Unfortunately, the data may be spread across multiple sources or applications, making it difficult for users of business software to draw the relevant connections and conclusions needed to succeed in a competitive marketplace.

Further, although different users of business software may place different importance on different portions of the available data based on their needs, existing services fail to meet the unique needs of each user.

What is needed is an easy, efficient way to present the most relevant information to a user according their needs.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Example embodiments of the present disclosure provide for a method, device, system, and computer program product for displaying relevant information compiled from multiple sources and related to user roles in multiple application environments.

In some embodiments, users may work with a collection of pre-defined, focused applications that are displayed on a multi-app home page based on a selected domain and/or role. In other embodiments, the collection of applications made visible to the user is configurable. In some embodiments, the collection of applications is configurable by the user's choice of available domains and/or roles. In another embodiment, the available domains and/or roles to a user are limited to specific domains and/or roles that are relevant to the user's duties, which may be identified, controlled, etc. by among other things access credentials, operational rules/rights/etc. (through for example an Access Control List (ACL)), etc.

In some embodiments, the applications are presented as tiles on the multi-app home page. In some embodiments, the application tiles display an application title and relevant information, data, or insights tailored to the user's selection of a domain and/or role/roles. In some embodiments, a particular application that may be displayed for multiple different domains and/or roles may display different information, data, or insights depending on the particular domain and/or role selected by the user.

In some embodiments, the collection of displayed applications on the multi-app home page may include an Overview Page application. The Overview Page is an application featuring a layout of multiple Variable Content Packets. In some embodiments, a Variable Content Packet is a container which displays a view of application data. In other embodiments, a Variable Content Packet is an expanded view of the application information, data, or insights displayed on the application tile as shown on the multi-app home page. That is, whereas the application information, data, or insight displayed on the application tile displayed on the multi-app home page may provide a high-level view of the relevant information, data, or insight, the Variable Content Packet can display more focused and detailed content. In some embodiments, the Variable Content Packet can display data, information, and/or content drawn from one or more data sources. In other embodiments, the Variable Content Packet can display data, information, and/or content drawn from one or more of the applications in the collection of applications configured on the multi-app home page based on the user's settings of domains and/or roles.

In some embodiments, the Overview Page may allow the user to select from a further subset of available roles based on the domains and/or roles configured at the multi-app home page level. In some embodiments, the selection/deselection/change of one or more roles may trigger a refresh of the Overview Page to display the appropriate Variable Content Packets with relevant content according to the newly selected/deselected/changed role or roles. In another embodiment, this selection/deselection/change of one or more roles and refresh of the Overview Page may cause a new Variable Content Packet to be generated, a previously displayed Variable Content Packet to be removed, and/or the relevant information, data, or content displayed in a particular Variable Content Packet to be changed.

In some embodiments, the content of the Variable Content Packets displayed on the Overview Page may be configurable by the user according to their needs. For example, the content may be filtered according to time and/or geography, or any other relevant characteristic. In other embodiments, these user-configured variant views of Variable Content Packets displayed on the Overview Page may be saved by the user to be recalled in the future as needed.

In some embodiments, the Variable Content Packets are a changeable size based on the intended amount of relevant information to display. Based on a user's domains and/or roles, Variable Content Packets may be system-generated for an Overview Page at a default size based on the system knowledge of the role and/or Variable Content Packet. In other embodiments, the default size of a Variable Content Packet to display may be configured by the user. In some embodiments, a Variable Content Packet may be manually expanded or collapsed to show more or less relevant content. In other embodiments, a Variable Content Packet may have actions associated with it. An action associated with a Variable Content Packet may have associated sub-actions. In some embodiments, a user may take action on Variable Content Packet content on an individual and/or a group basis. In other embodiments, the content of a Variable Content Packet may be actionable and launch the application from which the actionable content of the Variable Content Packet is derived.

Figure 1:
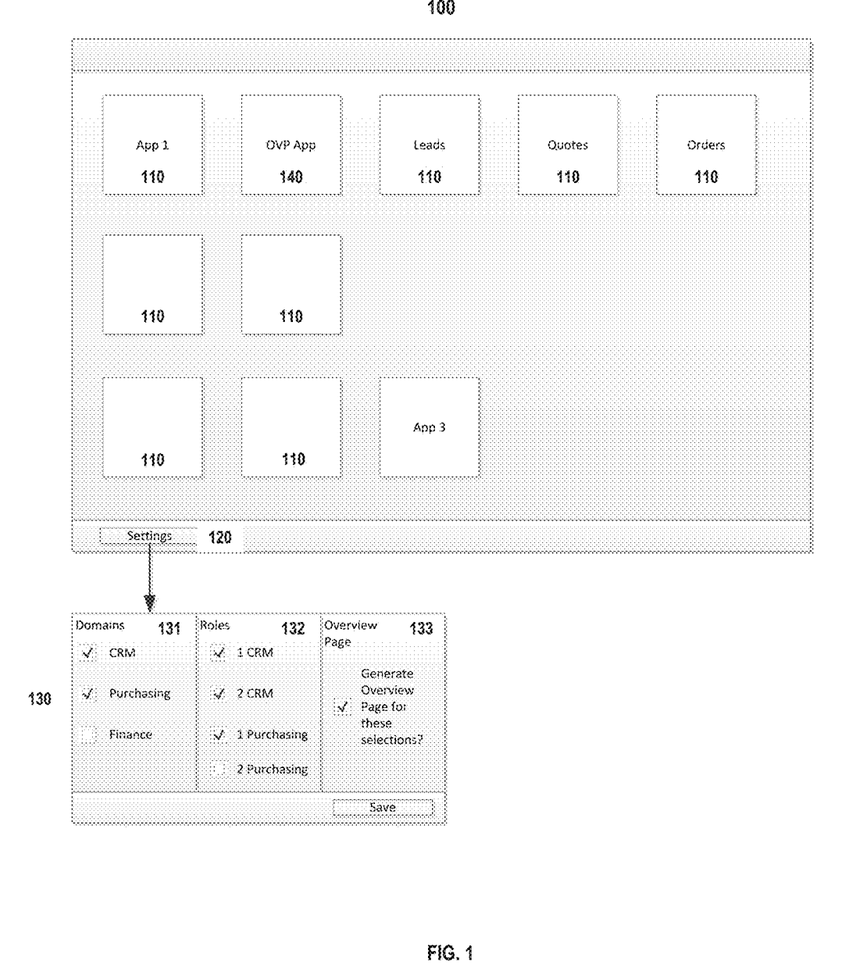
FIG. 1 shows a simplified user home page in a multi-application environment according to an example embodiment

FIG. 1 shows a simplified user home page 100 in a multi-application environment according to an example embodiment. In some embodiments, the multi-app user home page comprises a series of application tiles 110 that are available to the user based on the selected domains and/or roles. For example, as shown in FIG. 1, the user is presented with applications related to Leads, Quotes, and Orders. The application tiles 110 may display information, data, requests, deadlines, and other business information associated with the respective application. The application tiles 110 may be selectable by the user, and selection by the user may launch the respective application. Application tiles 110 may include the title of the application, and a relevant piece of data, insight, or other information about the relevant application content.

In some embodiments, the multi-app home page may comprise a selectable settings button 120. Selectable settings button 120 provides access to the settings area 130. In some embodiments, the available domains and/or roles to a user are limited to specific domains and/or roles that are relevant to the user's duties, which may be identified, controlled, etc. by among other things access credentials, operational rules/rights/etc. (through for example an Access Control List (ACL)), etc. The available domains may be displayed in domain area 131. Domains are to be understood as a broad categorization of a user's position, such as a department. For example, the user in FIG. 1 has the domains of "CRM," "Purchasing," and "Finance" available, although as discussed above, any domain relevant to the user's duties may be available. In some embodiments, the available domains may be selectable. For example, the user in FIG. 1. has selected the domains of "CRM" and "Purchasing." The available roles may be displayed in role area 132. Roles are a narrower categorization of a user's position than a domain, for example a group within a department. For example, the user in FIG. 1 has the roles of "1 CRM," "2 CRM," "1 Purchasing," and "2 Purchasing" available, although any role relevant to the user's duties may be available. In some embodiments, the available roles may be selectable. For example, the user in FIG. 1 has selected the roles of "1 CRM," "2 CRM," and "1 Purchasing."

In some embodiments, the selected domains and/or roles may configure the available applications on the multi-app home page. In some embodiments, the multi-app home page may refresh in real-time as available domains and/or roles are selected or unselected. In other embodiments, the multi-app home page may refresh when the user saves the selected settings. In some embodiments, application tiles 110 may be added, deleted, or moved around the multi-app home page layout when the multi-app home page is refreshed as a result of the selected domains and/or roles. In other embodiments, an application tile may be available for a number of different domains and/or roles, but the displayed insight may update when the multi-app home page is refreshed.

The settings area 130 may further comprise Overview Page area 133, wherein the user may select whether an Overview Page will be generated for the selected domains and/or roles. In some embodiments, the Overview Page is generated in real-time upon selection of the option to generate an Overview Page. In other embodiments, the Overview Page is generated when the user saves the selected settings. When the Overview Page is selected, an Overview Page application tile 140 will be shown on multi-app home page 100. Overview Page application tile 140 functions like any other application tile 110, and the user may launch the generated Overview Page application by selecting application tile 140.

Figure 2:
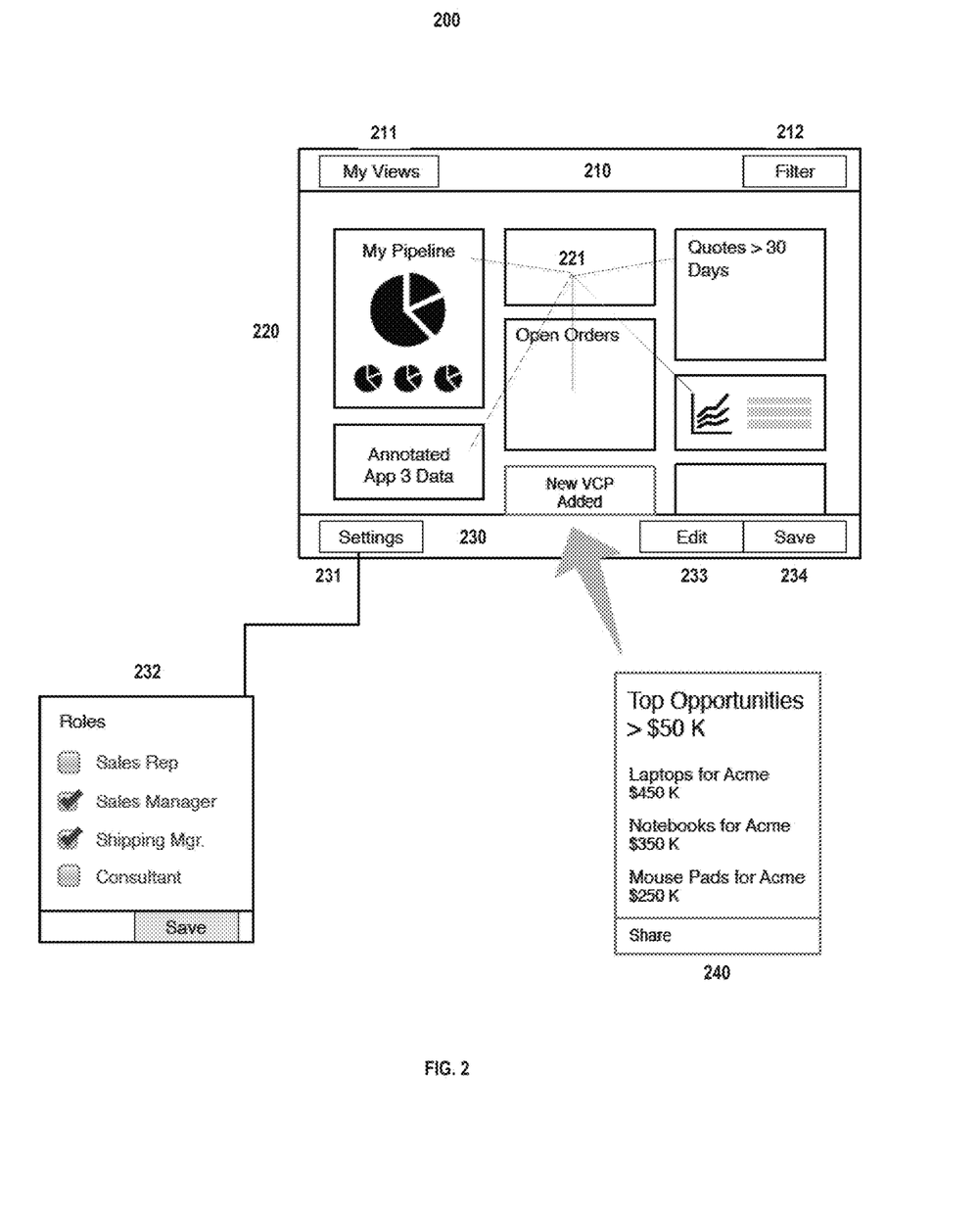
FIG. 2 shows a simplified Overview Page 200 according to an example embodiment.

FIG. 2 shows a simplified Overview Page 200 according to an example embodiment. The Overview Page 200 may include among other things a menu bar 210, a Variable Content Packet area 220, and a settings bar 230. Variable Content Packet area 220 may comprise a collection of Variable Content Packets 221. Variable Content Packets 221 collect and compile data from one or more sources that are relevant to the user according to the selected domains and/or roles. In some embodiments, the Variable Content Packets 221 may collect and compile application data from one or more applications that are relevant to the user according to the selected domains and/or roles. In other embodiments, the one or more data sources may include, for example, key performance indicator data from customer relationship manager software, business data from enterprise resource planning software, schedule data from calendar software, external data from a sensor or set of sensors, and/or remote data from one or more remote data sources, e.g., from the internet. Content from one or more of these data sources may be presented in a Variable Content Packet as filtered by the selected domains and/or roles.

For example, the Overview Page in FIG. 2 contains Variable Content Packets for the presentation of content related to "My Pipeline," "Open Orders," and "Quotes>30 Days," although Variable Content Packets may be generated and displayed containing any content relevant to the user according to the selected domains and/or roles. In some embodiments, application data displayed in a Variable Content Packet is drawn obtained from the respective application at the time the Overview Page is opened. In other embodiments, application data displayed in a Variable Content Packet is updated in real-time. In some embodiments, the user may save a particular VCP as a tile to be displayed on the multi-app home page 100.

In some embodiments, settings bar 230 may comprise a selectable "Settings" button 231 to provide access to the settings area 232. In some embodiments, settings area 232 provides a further subset of roles relevant to a user according to the domains and/or roles selected at the multi-app home page. The available sub-roles to a user may be identified, controlled, etc. by among other things access credentials, operational rules/rights/etc. (through for example an Access Control List (ACL)), etc. For example, the user in FIG. 2 has the roles of "Sales Rep," "Sales Manager," "Shipping Mgr.," and "Consultant" available, although any role relevant to the user's duties may be available. In some embodiments, the available roles may be selectable. For example, the user in FIG. 2 has selected the roles of "Sales Manager," "Shipping Mgr."

In some embodiments, the selected roles may configure the Variable Content Packets to be displayed on the Overview Page. In some embodiments, the multi-app home page may refresh in real-time as available roles are selected or unselected. In other embodiments, the Overview Page may refresh when the user saves the selected settings. In some embodiments, Variable Content Packets may be added, deleted, or moved around the Overview Page layout when the Overview Page is refreshed as a result of the selected roles. In other embodiments, a Variable Content Packet may be available for a number of different roles, but the displayed content may update when the multi-app home page is refreshed. For example, new Variable Content Packet 240 may be generated upon the selection of the "Sales Manager" role and displayed in the Variable Content Packet area 220.

Settings bar 230 may further comprise a selectable "Edit" button 233 to allow for configuration of the user's Overview Page. In some embodiments, the user may delete specific Variable Content Packets from the Overview Page area 220. In some embodiments, the user may be presented with Variable Content Packets that have previously been deleted, but would otherwise be available according to the selected domains and/or roles. The user may add specific Variable Content Packets to Overview Page area 220. In other embodiments, the user may alter the layout of Variable Content Packets 221 in the Overview Page area 220. In some embodiments, the user may resize Variable Content Packets.

In some embodiments, the user may further configure the Overview Page through filtering. Menu bar 210 contains a selectable "Filter" button 212 by which the user may filer the data and/or content of the displayed Variable Content Packets. Filtering may be done based on any relevant criteria, including, time or geography. For example, a user may wish to view only the sales from North America, or all global sales. A user may further wish to view only the sales from a particular quarter, or between specific dates. In some embodiments, the user may filter the Variable Content Packet data and/or content according to one or more criteria.

In some embodiments, the user may save the configured Overview Page for storage and later recall by selecting "Save" button 234 in settings bar 220. In some embodiments, the user may name a variant Overview Page during the saving process. In some embodiments, menu bar 210 may comprise a selectable "My Views" button 211 by which the user may recall their saved variant Overview Pages.

Figure 3A:
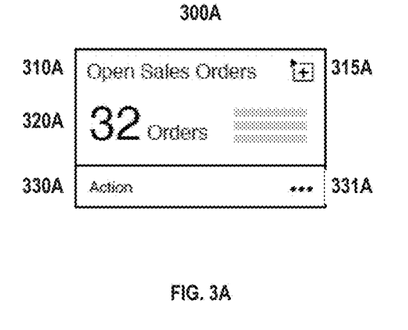
FIG. 3A-C shows simplified Variable Content Packets 300 according to an example embodiment.
Figure 3B:
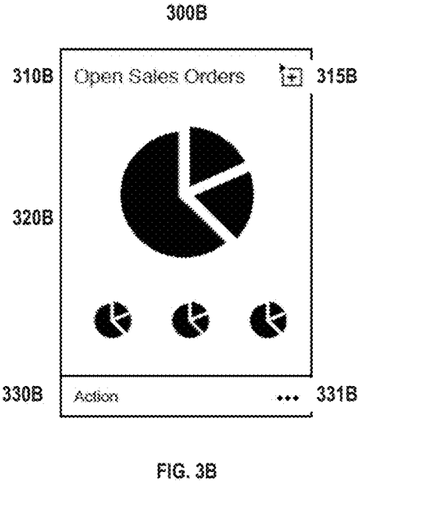
Figure 3C:
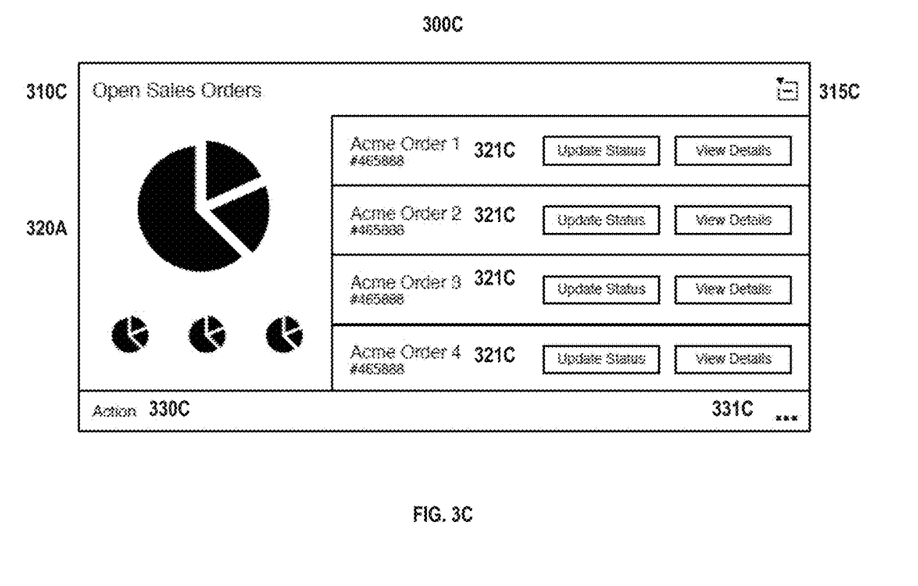

FIG. 3A-C shows simplified Variable Content Packets 300 according to an example embodiment. Variable Content Packet 300 may comprise a title 310, sizing toggle 315, content area 320, and action area 330. In some embodiments, Variable Content Packets 300 are changeable in size based on the intended amount of relevant data and/or content to display. FIG. 3A shows a simplified Variable Content Packet 300A at a small size. Corresponding content area 320A is small, and the amount of data and/or content is limited. For example, the only data and/or content displayed in content area 320A is the number of open sales orders, 32. In some embodiments, the user may configure the size of a Variable Content Packet by selecting toggle 315A. For example, the user may toggle the size of Variable Content Packet 300A from the small size shown in FIG. 3A to the medium size shown in FIG. 3B. The amount of data and/or content that may be shown in content area 320B of Variable Content Packet 300B is increased. For example, content area 320B may display further information about the open sales orders, such as visualizations of the open sales orders broken down by region, amount, or some other criteria.

In some embodiments, the user may select toggle 315B to decrease the size of Variable Content Packet to the small size shown in FIG. 3A, or to further increase the size of the Variable Content Packet to the large size shown in FIG. 3C. Content area 320C may now display even more relevant data. For example, content area 320C now displays individual open sales orders 321C. In some embodiments, the user may select toggle 315C to decrease the size of Variable Content Packet to the medium size shown in FIG. 3B, or the small size shown in FIG. 3A. In other embodiments, the Variable Content Packet may be resizeable with more granularity than the three sizes exemplified here.

In some embodiments, a re-sized Variable Content Packet may collect and compile data from the same, different, additional, or fewer data sources than when displayed at a different size. One of ordinary skill in the art will appreciate that the layout of relevant data as shown in the Variable Content Packets of FIG. 3 is exemplary only, and that additional layouts of, e.g., the title 310, sizing toggle 315, content area 320, and action area 330 may be contemplated within the context of the present disclosure. Variable Content Packets may also further comprise additional layout areas not specifically contemplated herein. In some embodiments, the layout of the Variable Content Packet may be determined based on the user's selected domains and/or roles. In other embodiments, the layout of a re-sized Variable Content Packet may be different from the layout of the Variable Content Packet when displayed at a different size.

In some embodiments, the default size of a Variable Content Packet may be determined based on the user's selected domains and/or roles. In other embodiments, the different Variable Content Packets to be displayed on a user's Overview Page may have different default sizes. In other embodiments, the user may adjust a default Variable Content Packet size to their preference.

In some embodiments, the content and/or data of Variable Content Packets 300 are actionable. That is, the user may select the data and/or content to launch the application from which the data and/or content was drawn. In other embodiments, the data and/or content may present specific user actions related to the displayed data and/or content. For example, open orders 321C provide user actions "Update Status" and "View Details." In some embodiments, the manipulation of data and/or content in a Variable Content Packet will exchange data with the application from which the data and/or content was drawn.

In some embodiments, Variable Content Packets may further comprise an action area 330 that presents an action for the user to take on the Variable Content Packet. Actions may include, but are not limited to, things such as sharing, refreshing, marking as completed, dismissing, saving to the multi-app home page, etc. In some embodiments, action area 330 is selectable and may trigger a primary action upon user selection. In other embodiments, action area 330 may comprise selectable action toggle 331, whereby secondary actions are displayed to the user upon triggering action toggle 331.

Figure 4:
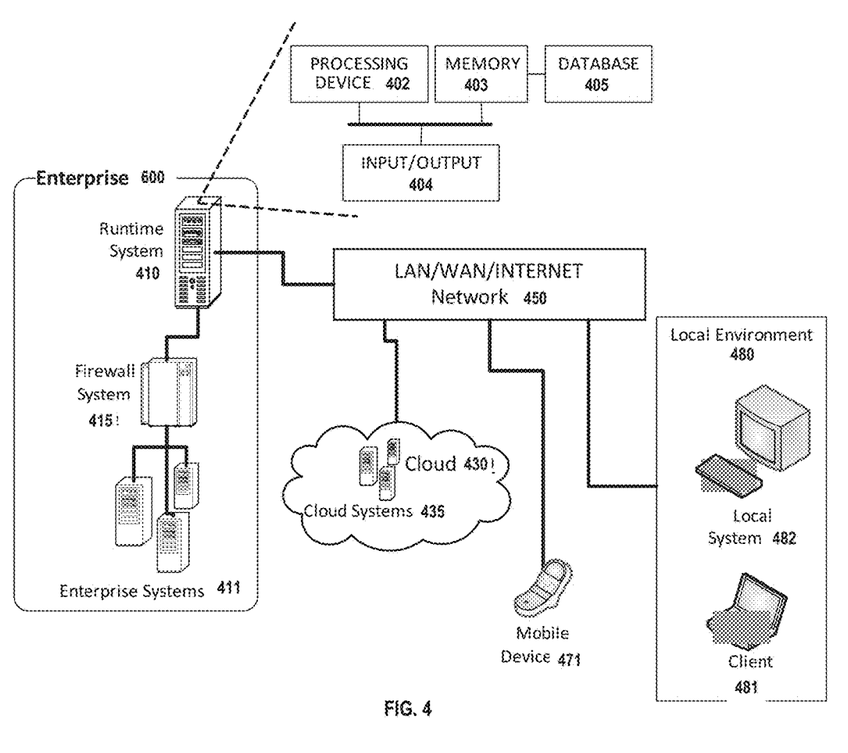
FIG. 4 shows an exemplary architecture of systems according to an example embodiment.

FIG. 4 shows an exemplary architecture of systems according to an example embodiment. Runtime system 410, may be connected to firewall system 415 and network 450. Network 450 may include a LAN, WAN, VPN, or the Internet. Mobile device 471, the local systems 482 and clients 481 in local environment 480, and the cloud systems 435 in the cloud environment 430 may also be connected to the network 450. The firewall system 415 may also be connected to the enterprise systems 411 and may provide an additional layer of security for enterprise systems 411 by preventing unauthorized access to these systems 411.

Each of the systems, clients, and devices in FIG. 4 may comprise any combination of one or more of inter alia a desktop computer, a notebook computer, a laptop computer, a tablet, a smartphone, a smartwatch, etc.

Each of the systems, clients, and devices in FIG. 4 may contain a processing device 402, memory 403 containing a database 405, and an input/output interface 404, all of which may be interconnected via a system bus. In various embodiments, each of the systems 411, 471, 410, 415, 430, 481, and 482 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 403 may contain different components for retrieving, presenting, changing, and saving data. Memory 403 may include a variety of memory devices, for example, Dynamic Random Access Memory (DRAM), Static RAM (SRAM), flash memory, cache memory, and other memory devices. Additionally, for example, memory 403 and processing device(s) 402 may be distributed across several different computers that collectively comprise a system.

Processing device 402 may perform computation and control functions of a system and comprises a suitable central processing unit (CPU). Processing device 402 may comprise a single integrated circuit, such as a microprocessing device, or may comprise any suitable number of integrated circuit devices and/or circuit boards working in cooperation to accomplish the functions of a processing device. Processing device 402 may execute computer programs, such as object-oriented computer programs, within memory 403.

Further, operation of the disclosed embodiments has been described in the context of servers and terminals that implement storage apparatus such as databases. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

The foregoing description has been presented for purposes of illustration and description.

It is not exhaustive and does not limit embodiments of the disclosure to the precise forms disclosed. Modifications and variations are possible in light of the above teachings or may be acquired from the practicing embodiments consistent with the disclosure. For example, some of the described embodiments may include software and hardware, but some systems and methods consistent with the present disclosure may be implemented in software or hardware alone. Additionally, although aspects of the present disclosure are described as being stored in memory, this may include other computer readable media, such as secondary storage devices, for example, hard disks, floppy disks, or CD ROM; the Internet or other propagation medium; or other forms of RAM or ROM.

The disclosure is also directed to computer program products comprising software stored on any computer useable medium. Such software, when executed in one or more data processing devices, causes data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

Based on the teachings contained in this disclosure, it will be apparent to persons skilled in the relevant art(s) how to make and use the disclosure using data processing devices, computer systems, and/or computer architectures other than that shown in FIG. 4. In particular, embodiments may operate with software, hardware, and/or operating system implementations other than those described herein.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

In addition, in the foregoing Detailed Description, various features may be grouped or described together for the purpose of streamlining the disclosure. This disclosure is not to be interpreted as reflecting an intention that all such features are required to provide an operable embodiment.

Particular method elements or steps described herein could be executed in different orders without departing from the scope or spirit of the disclosure.

The invention claimed is:

1. A computer-implemented method comprising:
   displaying, by at least one processor, at a user interface comprising a home page, configured to display at least one variable content packet within at least one of a plurality of tiles on the home page, at least one role corresponding to multiple domains, and at least one domain;
   selecting, by the at least one processor, at least one selected domain of the at least one domain displayed at the user interface, based on at least one user input;
   selecting, by the at least one processor, at least one selected role of the at least one role displayed, based on the at least one user input;
   compiling, by the at least one processor, data from one or more data sources according to the at least one selected domain and the at least one selected role;
   displaying, by the at least one processor, the compiled data in the at least one variable content packet;
   refreshing, by the at least one processor, the compiled data and a layout of the plurality of tiles displayed on the home page, upon selection of the at least one selected domain or the at least one selected role;

resizing, by the at least one processor, in response to at least one of the refreshing or a resizing input, the at least one variable content packet on the home page, wherein the at least one variable content packet comprises a default size and a plurality of size granularities for the resizing input;

adjusting, by the at least one processor, in response to the resizing, the one or more data sources represented in the compiled data, wherein the one or more data sources represented in the compiled data comprise different data sources in response to the at least one of the resizing or the refreshing;

displaying, by the at least one processor, one or more sub-roles;

selecting, by the at least one processor, an action and a sub-action, associated with the at least one variable content packet, and a selected sub-role of the one or more sub-roles displayed;

compiling, by the at least one processor, different data from the one or more data sources according to the at least one of the action, the sub-action, or the selected sub-role; and displaying, by the at least one processor, the compiled different data.

2. The computer-implemented method of claim 1, wherein the at least one role displayed is determined according to the at least one selected domain.

3. The computer-implemented method of claim 1, wherein the compiled data is displayed in the at least one variable content packet.

4. The computer-implemented method of claim 3, wherein the at least one variable content packet is displayed on an overview page, wherein the overview page is presented as a tile on the home page.

5. The computer-implemented method of claim 1, wherein the at least one sub-role displayed is determined according to at least one of the at least one selected domain and the at least one selected role.

6. The computer-implemented method of claim 1, further comprising:
filtering, by the at least one processor, the compiled data according to at least one criterion.

7. A system to display search results, the system comprising:
a display; and
at least one processor configured to:
display, at a user interface comprising a home page, configured to display at least one variable content packet within at least one of a plurality of tiles on the home page, at least one role corresponding to multiple domains, and at least one domain;
receive a selection of at least one selected domain of the at least one domain displayed at the user interface, based on at least one user input;
receive a selection of at least one selected role of the at least one role displayed, based on the at least one user input;
compile data from one or more data sources according to the at least one selected domain and the at least one selected role;
display the compiled data in the at least one variable content packet;
refresh the compiled data and a layout of the plurality of tiles displayed on the home page, upon selection of the at least one selected domain or the at least one selected role;
resize, in response to at least one of the refreshing or a resizing input, the at least one variable content packet on the home page, wherein the at least one variable content packet comprises a default size and a plurality of size granularities for the resizing input;
adjust, in response to the resizing, the one or more data sources represented in the compiled data, wherein the one or more data sources represented in the compiled data comprise different data sources in response to the at least one of the resizing or the refreshing; display one or more sub-roles;
receive a selection of an action and a sub-action, associated with the at least one variable content packet, and a selected sub-role of the one or more sub-roles displayed;
compile different data from the one or more data sources according to the at least one of the action, the sub-action, or the selected sub-role; and
display the compiled different data.

8. The system of claim 7, wherein the at least one role displayed is determined according to the at least one selected domain.

9. The system of claim 7, wherein the compiled data is displayed in the at least one variable content packet.

10. The system of claim 9, wherein the at least one variable content packet is displayed on an overview page, wherein the overview page is presented as a tile on the home page.

11. The system of claim 7, wherein the at least one sub-role displayed is determined according to at least one of the at least one selected domain and the at least one selected role.

12. The system of claim 7, wherein the at least one processor is further configured to:
filter the compiled data according to at least one criterion.

13. A non-transitory computer-readable medium storing program instructions thereon that, when executed, cause at least one processor to automatically perform actions comprising:
displaying, at a user interface comprising a home page, configured to display at least one variable content packet within at least one of a plurality of tiles on the home page, at least one role corresponding to multiple domains, and at least one domain;
selecting a selection of at least one selected domain of the at least one domain displayed at the user interface, based on at least one user input;
selecting at least one selected role of the at least one role displayed, based on the at least one user input;
compiling data from one or more data sources according to the at least one selected domain and the at least one selected role;
displaying the compiled data in the at least one variable content packet;
refreshing the compiled data and a layout of the plurality of tiles displayed on the home page, upon selection of the at least one selected domain or the at least one selected role;
resizing, in response to at least one of the refreshing or a resizing input, the at least one variable content packet on the home page, wherein the at least one variable content packet comprises a default size and a plurality of size granularities for the resizing input;
adjusting, in response to the resizing, the one or more data sources represented in the compiled data, wherein the one or more data sources represented in the compiled data comprises different data sources in response to the at least one of the resizing or the refreshing;

displaying one or more sub-roles;

selecting an action and a sub-action, associated with the at least one variable content packet, and a selected sub-role of the one or more sub-roles displayed;

compiling different data from the one or more data sources according to the at least one of the action, the sub-action, or the selected sub-role; and displaying the compiled different data.

14. The non-transitory computer-readable medium of claim 13, wherein the at least one role displayed is determined according to the at least one selected domain.

15. The non-transitory computer-readable medium of claim 13, wherein the compiled data is displayed in the at least one variable content packet.

16. The non-transitory computer-readable medium of claim 15, wherein the at least one variable content packet is displayed on an overview page, wherein the overview page is presented as a tile on the home page.

17. The non-transitory computer-readable medium of claim 13, wherein the at least one sub-role displayed is determined according to at least one of the at least one selected domain and the at least one selected role.

18. The non-transitory computer-readable medium of claim 13, the actions further comprising:

filtering the compiled data according to at least one criterion.

* * * * *